United States Patent

Gray et al.

[11] Patent Number: 5,981,034
[45] Date of Patent: *Nov. 9, 1999

[54] RELEASE LINER FABRIC HAVING EDGE REINFORCEMENT

[75] Inventors: Keith N. Gray, Greensboro; Earl T. Crouch, High Point; Michael D. Bertolucci, Greensboro, all of N.C.

[73] Assignee: Highland Industries, Inc., Greensboro, N.C.

[*] Notice: This patent is subject to a terminal disclaimer.

[21] Appl. No.: 09/023,131

[22] Filed: Feb. 12, 1998

Related U.S. Application Data

[62] Division of application No. 08/823,248, Mar. 24, 1997, Pat. No. 5,718,966, which is a continuation of application No. 08/328,835, Oct. 25, 1994, abandoned.

[51] Int. Cl.$^6$ ...................................... B32B 23/02
[52] U.S. Cl. ........................... 428/193; 428/192; 156/88
[58] Field of Search ..................... 428/193, 192; 156/88

[56] References Cited

U.S. PATENT DOCUMENTS

| | | | |
|---|---|---|---|
| 3,807,754 | 4/1974 | Rodenbach et al. | 280/150 |
| 3,991,249 | 11/1976 | Yamashita et al. | 428/257 |
| 4,198,465 | 4/1980 | Moore et al. | 428/409 |
| 4,911,471 | 3/1990 | Hirabayashi | 280/732 |
| 4,921,735 | 5/1990 | Bloch | 428/34.9 |
| 4,934,734 | 6/1990 | Takada | 280/731 |
| 4,966,389 | 10/1990 | Takada | 280/743 |
| 5,046,759 | 9/1991 | Enniss et al. | 280/743 |
| 5,085,917 | 2/1992 | Hodnett, III | 428/173 |
| 5,100,168 | 3/1992 | Horiuchi et al. | 280/728 |
| 5,114,180 | 5/1992 | Kami et al. | 280/743 |
| 5,126,189 | 6/1992 | Tanny et al. | 428/220 |

FOREIGN PATENT DOCUMENTS

| | | |
|---|---|---|
| 0496894A1 | 4/1992 | European Pat. Off. |
| 2299-952 | 4/1989 | Japan . |
| WO90/01436 | 8/1990 | Japan . |
| WO91/18760 | 4/1991 | Japan . |
| 2252983 | 1/1992 | United Kingdom . |

*Primary Examiner*—Helen L. Pezzuto
*Attorney, Agent, or Firm*—Rhodes & Mason, PLLC

[57] ABSTRACT

A method for reinforcing fabric edges to prevent raveling or fraying of a release liner fabric during cutting and subsequent use. The method is carried out by coating the yarn crossovers with a flexible, thin film of a radiation polymerized resin and then curing the coating system at high production speeds. The fabric is cut in those areas where the cured coating is applied, thereby providing a band or border of cured resin of sufficient width to prevent raveling of the fabric edge. The method is particularly suitable for the fabrication of release liners used for the protection of rubber sheeting for manufacturing automobile tires.

7 Claims, No Drawings

RELEASE LINER FABRIC HAVING EDGE REINFORCEMENT

This is a divisional application of Ser. No. 08/823,248, filed Mar. 24, 1997, now U.S. Pat. No. 5,718,966, issued on Feb. 17, 1998, which in turn is a continuation application of Ser. No. 08/328,835, filed Oct. 25, 1994, now abandoned.

BACKGROUND OF THE INVENTION (1) Field of the Invention

The present invention relates to reinforcing the edges of a fabric panel. More specifically, the present invention relates to a method of coating the edges of a release liner fabric to prevent raveling or fraying during cutting and subsequent use.

(2) Description of the Prior Art

Woven fabrics that are made from thermoplastic yarns tend to disassemble along the cut edge when cut and subsequently handled. This disassembly occurs as the result of the untangling of the warp and weft yarns and is commonly known as raveling.

Raveling significantly reduces the efficiency of subsequent article handling operations such as winding and unwinding and shipping and seriously reduces the strength of the fabric at its edges. Release liners fabricated from fabrics with edges having untangled warp and weft yarns tend to pull apart when stressed during handling. This phenomenon is generally referred to as raveling. When this deficiency, particularly in strength, occurs in release liners for shipping rolled rubber sheeting for use in manufacturing tires, unacceptable damage to the release liner causes shorten life of the liner and possible contamination of the rolled rubber sheeting.

Various physical procedures have been proposed and adopted to prevent edge raveling. These include fusing the warp and weft yarns along the cut edge by various means during the cutting process. Processes known to be commonly used in this regard are based on hot-die slitting and laser cutting methods. Generally, these methods are unacceptably slow or add significant costs to the production of the finished article.

Fabric typically used for release liners in shipping rolls of calendared rubber sheeting for manufacturing tires for automobiles and other vehicles must satisfy a number of unique and demanding requirements. Fabrics that are useful for release liner construction are required to be strong, lightweight, resistant to abrasion and have good release from the rubber stock.

Typically, conventional release liners meeting the above objectives are made of coated fabrics like siloxane-coated nylon or acrylic-coated polyester. In either case, the release liner fabric panel requires fabric edge reinforcement to provide longer service life.

SUMMARY OF THE INVENTION

The present invention is directed to a method for reinforcing the fabric edges of a release liner to prevent raveling or fraying of the yarns during use. To this end, the process is carried out by coating the yarn crossovers with a flexible, thin film of a radiation polymerized resin and then curing the coating system at high production speeds. Fabrics treated by the process of the present invention have a significantly reduced tendency to ravel during cutting, handling and use. Further, fabrics that are reinforced produce better end results in applications in which they are used as compared to fabrics that are not reinforced. For example, the process, which is based on high speed radiation curable resin coating, is particularly suitable for the fabrication of release liners used for the production of rolled rubber sheeting used in manufacturing tires made from fabrics such as nylon, polyester and polyolefin.

Accordingly, one aspect of the present invention is to provide a method for reinforcing the edge of a release liner fabric. The method includes the steps of: (a) applying a thin layer of a radiation-curable resin to a pre-selected area of the edge of the fabric to be cut, the radiation-curable resin being curable and crosslinkable at substantially ambient temperatures; (b) irradiating the coated fabric of step (a) in at least those areas containing the radiation-curable resin under conditions to cure and crosslink the resin into a thin, flexible, nonreactive coating impregnating the fabric and securing the yarn crossovers together to prevent raveling; and (c) cutting the irradiated fabric in the coated areas thereby leaving the cut edge ravel-resistant.

Another aspect of the present invention is to provide a release liner fabric having a reinforced edge. The release liner includes: (a) an elongated fabric panel; and (b) a thin layer of a radiation-curable resin applied to a pre-selected area of the edge of the fabric to be cut, the radiation-curable resin being curable and crosslinkable at substantially ambient temperatures.

Still another aspect of the present invention is to provide a reinforced edge for a release liner fabric panel. The reinforced edge includes a thin layer of a radiation-curable resin applied to a pre-selected area of the edge of the fabric, the radiation-curable resin being curable and crosslinkable at substantially ambient temperatures, the resin being selected from the group consisting of polyfunctional acrylic monomers, acrylated urethane oligomers and acrylated urethane polymers.

A final aspect of the present invention is to provide a release liner fabric having a reinforced edge. The release liner includes: (a) an elongated fabric panel; (b) a release finish uniformly coated on at least one of its entire surfaces of the fabric panel; and (c) a thin layer of a radiation-curable resin applied to a pre-selected area of the edge of the fabric to be cut, the radiation-curable resin being curable and crosslinkable at substantially ambient temperatures, the resin being selected from the group consisting of polyfunctional acrylic monomers, acrylated urethane oligomers and acrylated urethane polymers.

These and other aspects of the present invention will become apparent to those skilled in the art after a reading of the following description of the preferred embodiment.

DESCRIPTION OF THE PREFERRED EMBODIMENTS

The inventors have found that coating compositions containing an initiator, polyfunctional acrylic monomers, acrylated urethane oligomers and acrylated urethane polymers in combination with other additives, produce radiation curable and crosslinked coatings which are highly effective in enhancing the ravel resistance of cut fabric edges without the shortcomings associated with the above-mentioned prior art.

In practicing the present invention, the radiation curable coating compositions are first compounded by adding together the polyfunctional acrylic monomer or mixtures thereof, optionally an ultraviolet (UV) sensitizer, and optionally, any other additives. The various components are thoroughly mixed so as to form a generally homogeneous coating composition. A thin, uniform coating of the coating solution is then applied onto the fabric surface by any of the known means such as dipping, spraying, screen printing, rollcoating and the like. In the instant invention, screen or gravure applications are preferred. The coating is then cured (optionally in an inert, e.g., [nitrogen] atmosphere) using ultraviolet or, optionally, electron beam radiation. Preferably, UV radiation which can have a wavelength of from 1000 Å to 3900 Å is the most cost effective.

In the present invention, the lamp systems used to generate such radiation can consist of ultraviolet lamps which can include discharge lamps, i.e., xenon, metallic halide, metallic arc, or mercury vapor discharge lamp, etc., having operating pressures of from as low as a few milli-torr up to about 10 atmospheres. Curing by exposure to an electron beam is also possible. The electron source may be gamma or pile sources, or electrostatic methods. For purposes of the present invention, curing is defined as the copolymerization of the polyfunctional acrylic monomers, acrylated urethane oligomers and polymers to form a flexible coating.

The reaction chemistry of crosslinking through radiation induced polymerizations of, for example, UV-curable coatings, is generally known to those skilled in the art.

In the practice of this invention, the UV curable coating is generally formed by, but is not restricted to, the polymerization of acrylated urethane oligomers.

The principle components of the embodied coating materials for this application are of two main types. These are:
1. Resins. These may be oligomers or prepolymers.
2. Diluents. These may be:
   a. reactive monomers or oligomers.
   b. unreactive compounds that plasticize the cured film.

Preferred materials should give a hard but flexible coating with good adhesion to various fabric substrates. The coating must have acceptable wetting and flow characteristics to provide for uniform application to fabric.

Resin types generally used include:

Unsaturated Polyesters

Acrylated Polyesters

Acrylated Epoxy Esters

Acrylated Isocyanates

Acrylated Triazines

Acrylated Polyethers

Thiol-ene Systems:

Cationic cured epoxy systems

Aminoplasts cured by photoliberated acids

A preferred aspect of the invention is the use of acrylated polyurethane resin materials and reactive oligomers.

Urethane resins may be prepared as follows from reactions of isocyanates with compounds containing hydroxyl groups such as alcohols:

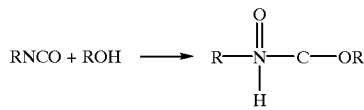

Unsaturation may then be readily introduced when R is acrylic, allylic, vinylic, et al. For example:

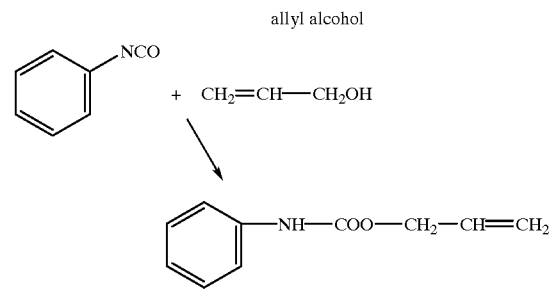

More complicated urethanes may be prepared by reacting:

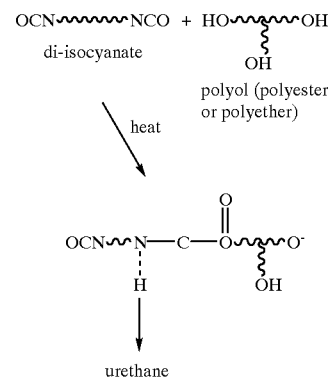

Unsaturation may also be introduced by reacting a hydroxyl-modified acrylic or methacrylic monomer with a polyisocyanate to obtain a urethane-type resin containing acrylic linkages which can then undergo free-radical photopolymerization.

Di-isocyanates are frequently used, allowing large structures to be formed, especially when the chain is lengthened by ethylene oxide derivatives, amino alcohols, polyesters, diamines, etc. as shown below.

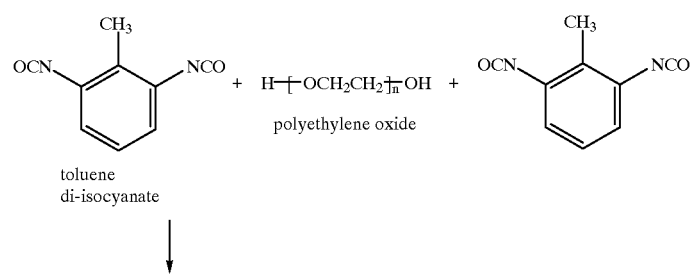

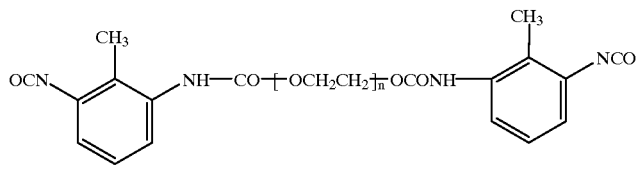

Very large complicated urethane structures may be built up by combinations with acrylics and polyester/urethane complexes, e.g., a polyester/acrylate may be based upon adipic acid (AD) and hexanediol (HD) reacted through its terminal hydroxyl groups with acrylic acid to give a structure of the form:

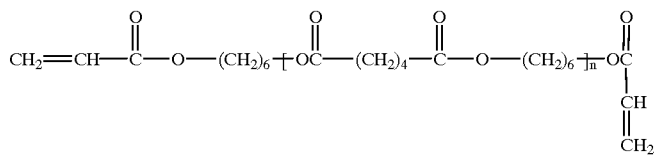

and this same polyester acrylate may then be reacted with toluene-di-isocyanate (TDI),

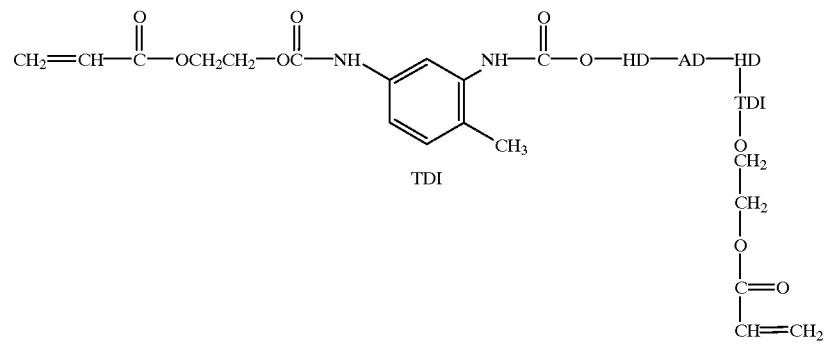

followed by further reaction with hydroxyethyl acrylate to give a possible structure of the form:

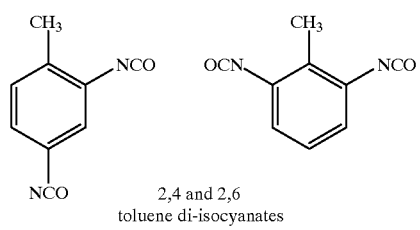

2,4 and 2,6 toluene di-isocyanates

Illustrative examples of other starting materials for synthesis of polyurethanes include optional di-isocyanates as shown in Table 1 and polyether polyols as shown in Table 2. The preceding overview of polyurethane chemistry is essentially that of Roffey, and is hereby incorporated by reference from *Photopolymerization of Surface Coatings*, C. G. Roffey, John Wiley & Sons: New York, pp. 153–156.

TABLE 1

| Representative Di-isocyanates | |
|---|---|
| Name | Structure |
| PPDI | ![NCO-C6H4-NCO para] |
| TDI | ![NCO-C6H3(CH3)-NCO with methyl] |

TABLE 1-continued

Representative Di-isocyanates

| Name | Structure |
|---|---|
| MDI | 4,4'-methylenediphenyl diisocyanate (OCN-C6H4-CH2-C6H4-NCO) |
| PMDI | polymeric MDI (oligomeric structure with NCO groups and CH2 bridges, subscript n) |
| NDI | 1,5-naphthalene diisocyanate |
| TODI | 3,3'-dimethyl-4,4'-biphenylene diisocyanate (OCN-C6H3(CH3)-C6H3(CH3)-NCO) |
| XDI | xylylene diisocyanate (CH2NCO groups on benzene ring) |
| HDI | OCN(CH2)6NCO |
| TMDI | OCN-CH(CH3)-CH2-C(CH3)2-CH2-CH2-NCO (trimethyl variant) |
| | OCN-CH(CH3)-CH2-C(CH3)(CH3)-CH2-CH2-NCO |
| CHDI | 1,4-cyclohexane diisocyanate (NCO groups on cyclohexane) |
| BDI | bis(isocyanatomethyl)cyclohexane (CH2NCO groups on cyclohexane) |

TABLE 1-continued

Representative Di-isocyanates

| Name | Structure |
|---|---|
| H6XDI | 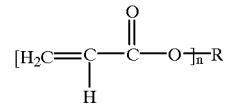 hydrogenated XDI (CH2NCO groups on cyclohexane) |

TABLE 2

Representative polyether Polyols

| Product | Functionality |
|---|---|
| poly(ethylene glycol) (PEG) | 2 |
| poly(propylene glycol) (PPG) | 2 |
| PPG/PEG* | 2 |
| poly(tetramethylene glycol) (PTMG) | 2 |
| glycerol adduct | 3 |
| trimethylolpropane adduct | 3 |
| pentaerythritol adduct | 4 |
| ethylenediamine adduct | 4 |
| phenolic resin adduct | 4 |
| diethylenetriamine adduct | 5 |
| sorbitol adducts | 6 |
| sucrose adducts | 8 |

*Random or block copolymers.

The reactive monomers of the present invention are represented by the general formula (1):

$$[H_2C=C(H)-C(=O)-O]_n-R \qquad (1)$$

Where "n" is an integer from 1 to 8, preferably from 2 to 6, and more preferably from 2 to 4; and "R" is an "n" functional hydrocarbon, an "n" functional substituted hydrocarbon, an "n" functional hydrocarbon containing at least one ether linkage, an "n" functional substituted hydrocarbon containing at least one ether linkage.

Preferred "n" functional hydrocarbons are the "n" functional aliphatic, preferably saturated aliphatic, hydrocarbons containing from 1 to about 20 carbon atoms and the "n" functional aromatic hydrocarbons containing from 6 to about 20 carbon atoms.

Preferred "n" functional hydrocarbons containing at least one ether linkage are the "n" functional aliphatic hydrocarbons, preferably saturated aliphatic hydrocarbon residues, containing from 1 to about 5 ether linkages and from 2 to about 20 carbon atoms.

Preferred "n" functional substituted hydrocarbons are the "n" functional aliphatic hydrocarbons, preferably the saturated aliphatic hydrocarbons, containing from 1 to about 20 carbon atoms, and the "n" functional aromatic hydrocarbons containing from 6 to about 10 carbon atoms which contain substituent groups such as the halogens, i.e., fluorine, chlorine, bromine and iodine, and/or substituent groups such as hydroxyl, —COOH, —COH and —COOR' groups wherein "R'" represents alkyl groups containing from 1 to about 6 carbon atoms.

Preferred "n" functional substituted hydrocarbons containing at least one ether linkage are the "n" functional aliphatic, preferably saturated aliphatic, hydrocarbons containing from 2 to about 20 carbon atoms and from 1 to about 5 ether linkages which contain substituent groups such as the halogen hydroxyl, —COOH, —COH, and —COOR' groups wherein "R'" is as defined above.

The more preferred polyfunctional acrylic monomers are those represented by Formula 1 wherein "R" is selected from the group consisting of an "n" functional saturated aliphatic hydrocarbon containing from 1 to about 20 carbon atoms, a hydroxyl substituted "n" functional saturated aliphatic hydrocarbon containing from about 1 to about 20 carbon atoms, an "n" functional saturated aliphatic hydrocarbon containing from 2 to about 20 carbon atoms and from 1 to about 5 ether linkages, and a hydroxyl substituted "n" functional saturated aliphatic hydrocarbon containing from 2 to about 20 carbon atoms and from 1 to about 5 ether linkages.

The preferred polyfunctional acrylate ester monomers are those wherein "R" is an "n" functional saturated aliphatic hydrocarbon, ether, or polyether, with those monomers wherein "R" is an "n" function saturated aliphatic hydrocarbon being more preferred.

More particularly, the di-functional acrylic monomers, or diacrylates, are represented by Formula 1 wherein "n" is 2; the trifunctional acrylic monomers, or triacrylates, are represented by Formula 1 wherein "n" is 3; and the tetrafunctional acrylic monomers, or tetra-acrylates, are represented by Formula 1 wherein "n" is 4. Illustrative of suitable polyfunctional acrylate ester monomers of Formula 1 are those listed below in Table 3.

These polyacrylate esters and their production are well known to those skilled in the art. The preceding is incorporated by reference from U.S. Pat. No. 4,198,465 by Moore, et al.

TABLE 3

Polyacrylates of Formula 1

1. $CH_2$=CHCOO—$CH_2$—OOCCH=$CH_2$
2. CH=CHCOO—$CH_2$—$CH_2$—OOCCH=$CH_2$
3. $CH_2$=CHCOO—$CH_2$—CHOHOCH$_2$—OOCCH=$CH_2$
4. $CH_2$=CHCOO—$(CH_2)_4$—OOCCH=$CH_2$

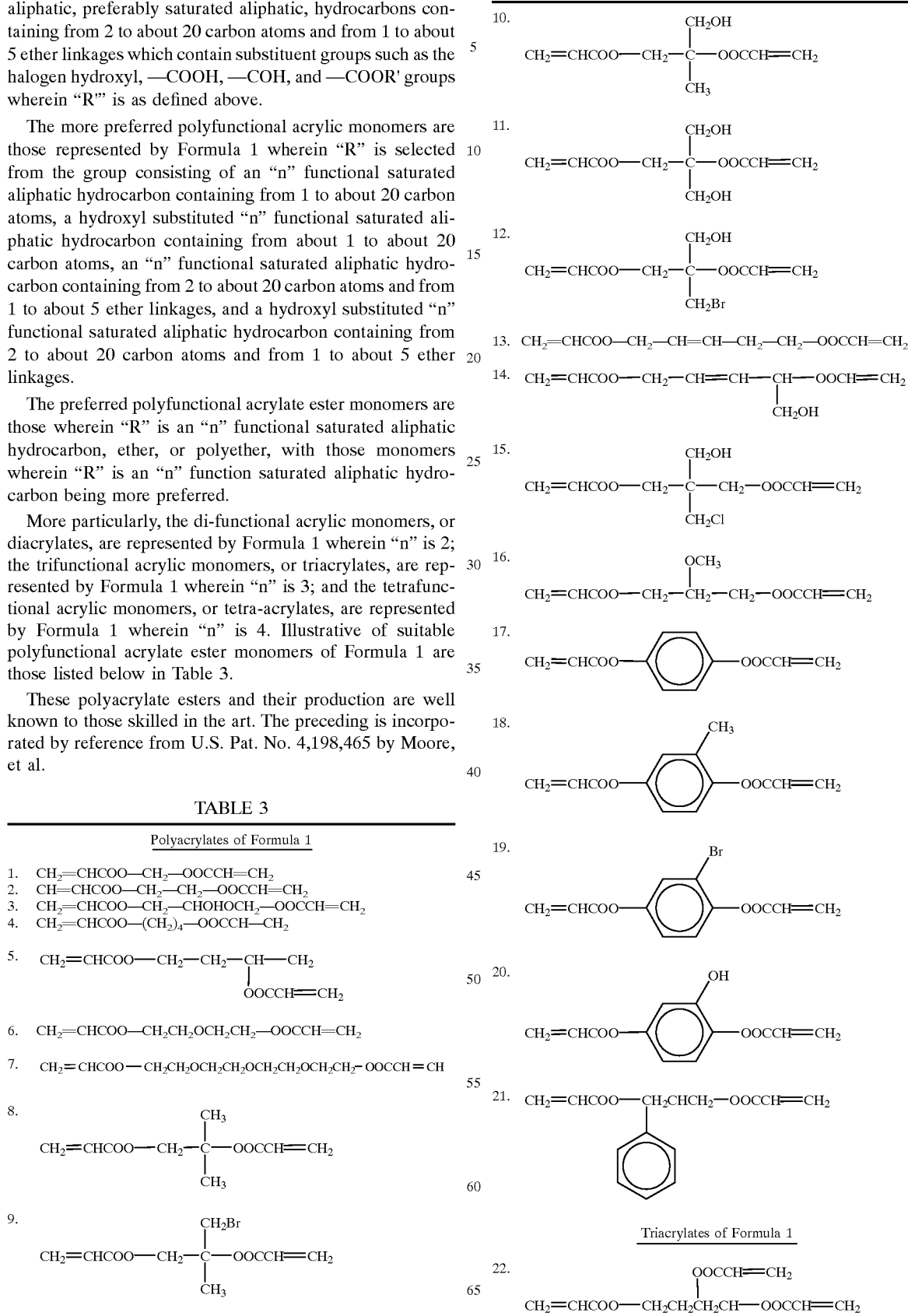

TABLE 3-continued

23. 
$$CH_2=CHCOO-CH_2$$
$$CH_2=CHCOO-CH_2-\underset{|}{\overset{|}{C}}-CH_2=CH_2$$
$$CH_2=CHCOO-CH_2$$

24. 
$$\phantom{CH_2=CHCOO-CH_2-}CH_2OH$$
$$CH_2=CHCOO-CH_2-\underset{|}{\overset{|}{C}}-CH_2-OOCCH=CH_2$$
$$\phantom{CH_2=CHCOO-CH_2-}CH_2-OOCCH=CH_2$$

25. 
$$CH_2=CHCOO-C_6H_3(OOCCH=CH_2)-OOCCH=CH_2$$
(with OOCCH=CH₂ substituents on benzene ring)

26. 
$$CH_2=CHCOO-CH_2$$
$$CH_2=CHCOO-CH_2-\overset{|}{CH}-CH_2-OOCCH=CH_2$$
$$CH_2=CHCOO-CH_2$$

27. 
$$CH_2=CHCOO-CH_2-\overset{|}{CH}-\overset{|}{CH}-CH_2-OOCCH=CH_2$$
$$CH_2=CHOO-CH_2 \quad CH_2-OOCCH=CH_2$$

28. 
$$CH_2=CHCOO-CH_2CHCH-CH_2CH-OOCCH=CH_2$$
$$CH_2=CHCOO-CH_2 \quad CH_2-OOCCH=CH_2$$

These polyacrylate esters and their production are well known to those skilled in the art. One method of producing the di-, tri-, and tetra-acrylate esters involves reacting acrylic acid with a di-, tri-, or tetrahydroxyl compound to produce the di-ester, tri-ester or tetra-ester. Thus, for example, acrylic acid can be reacted with ethylene glycol to produce ethylene glycol diacrylate (compound 2 in Table 3).

Although the coating compositions may contain only one of said polyfunctional acrylate monomers, coating compositions may contain a mixture of two polyfunctional monomers, preferably a diacrylate and a triacrylate. When the coating compositions contain a mixture of acrylate monomers, it is preferred that the ratio, by weight, of the diacrylate to the triacrylate be from about 30/70 to about 70/30. Exemplary mixtures of diacrylates and triacrylates include mixtures of hexanediol diacrylate with pentaerythritol triacrylate, hexanediol diacrylate with trimethylolpropane triacrylate, diethyleneglycol diacrylate with trimethylolpropane triacrylate.

While the corresponding coatings may likewise contain the ultraviolet light reaction product of a single polyfunctional acrylate monomer, coatings containing the photoreaction product of two polyfunctional acrylate monomers, preferably a diacrylate and a triacrylate, are preferred.

Generally, the coating composition contains from about 40 to about 99 weight percent of the polyfunctional acrylate or acrylates. The UV cured coating contains from about 40 to about 99 weight percent of the photoreaction products of the polyfunctional acrylate monomer or mixture of acrylate monomers present in the coating composition.

The photocurable coating compositions also contain a photosensitizing amount of photosensitizer, i.e., an amount effective to initiate the photocure of the coating composition. Generally, this amount is from about 0.01% to about 10% weight, preferably from about 0.1% to about 10% weight, and more preferably from about 0.1% to about 5% by weight of the photocurable coating composition. These additives and the cure thereof are generally well known in the art. Some non-limiting examples of these UV radiation photosensitizers include ketones, such as benzophenone, acetophenone, benzyl, benzyl methyl ketone, benzoins and substituted benzoins such as benzoin methyl ether, a-hydroxymethyl benzoin isopropyl ether; halogen-containing compounds such as o-bromoacetophenone, p-bromoacetophenone, and the like.

The coating compositions of the present invention may also optionally contain various flame retardants, flatting agents, surface active agents, thixotropic agents, UV light absorbers and dyes. All of these additives and the use thereof are well known in the art and do not require extensive discussions. Therefore, only a limited number will be referred to, it being understood that any compounds possessing the ability to function in such a manner, i.e., as a flame retardant, flatting agent, surface active agent, UV light absorber, and the like, can be used so long as they do not deleteriously affect the photocuring of the coating compositions.

The various surface-active agents, including anionic, cationic and nonionic surface-active agents are described in *Kirk-Othmer Encyclopedia of Chemical Technology,* Vol. 19, Interscience Publishers, New York, 1970, pp. 477–486, a reference incorporated herein.

Accordingly, in the preferred embodiment, the method for reinforcing the edge of a release liner fabric according to the present invention includes applying a thin layer of a radiation-curable resin to a pre-selected area of the edge of the fabric to be cut, wherein the resin further includes an initiator.

The radiation-curable resin is curable and crosslinkable at substantially ambient temperatures and selected from the group consisting of polyfunctional acrylic monomers, acrylated urethane oligomers and acrylated urethane polymers. After application by conventional means, the next step is irradiating the coated fabric in at least those areas containing the radiation-curable resin under conditions to cure and crosslink the resin into a thin, flexible, nonreactive coating impregnating the fabric and securing the yarn crossovers together to prevent raveling. Finally, the irradiated fabric is cut in the coated areas thereby leaving the cut edge ravel-resistant. The resulting stabilized fabric has three times the life of a comparable fabric without the edge treatment according to the present invention.

In a most preferred embodiment, the fabric is coated with the radiation-curable resin in patterns defining a plurality of parallel bands extending lengthwise, irradiated and cut within the bands of irradiated resin to form release liners of predetermined widths.

In one embodiment, the fabric is woven nylon and the fabric is uniformly coated on at least one of its entire surfaces with a siloxane release finish prior to being irradiated and cut to form said release liner.

In another embodiment, the fabric is woven polyester and the fabric is uniformly coated on at least one of its entire surfaces with an acrylic release finish prior to being irradiated and cut to form said release liner. In either case the fabric may be cut with a reciprocating knife or other slitting means.

In the preferred embodiment, the fabric is woven in a plain square weave. Also, preferably, the fabric is formed from warp yarn having a denier of between about 150 to 1000 and from weft yarn having a denier of between about 150 to 1000 wherein the fabric has a weight of between about 3 oz/yd² to 8 oz/yd².

In the preferred embodiment, the edge is between about 0.25 to 2.0 inches in width but because the resin wets the fabric, the resin does not form a thickened edge. This prevents "dumb belling" which would occur when the release liner is rolled if it had a thickened edge.

By way of example and not limitation, the following examples serve to further illustrate the present invention in its preferred embodiments.

EXAMPLE I

Fabrics are rendered ravel-resistant by applying a thin, flexible polymerized coating at the edges thereof and in areas where raveling due to abrasion is likely to occur or where reinforcement is required. The process of this invention includes applying a liquid, radiation-curable resin system, in uncured or uncrosslinked form, pre-determined to selected areas of a fabric in a pattern matching or approximating the areas and shapes of the fabric to be cut. Conveniently, the fabric is in open width.

Next, the applied resin system is exposed to the type of radiation needed to cure and crosslink the resin, depending upon the catalyst crosslinker, etc., system employed (see the following discussion), typically UV radiation. Once the liquid resin system is cured, it solidifies into a non-tacky coating and is preferably clear and transparent or substantially transparent.

Next, the fabric is cut in the areas where the cured coating was applied. Cutting may be accomplished by any convenient means, including knife cutting. The area of the cut is aligned with or arranged to be within the coated area so as to leave a band or border of cured resin of sufficient width to prevent raveling of the nonselvage edge. The cut edge thus formed is resistant to raveling during use as a release liner for the separation of calendared rubber sheeting used for the production of tires and other molded rubber products.

EXAMPLE II

Another objective of this invention is to provide a procedure for preventing the cut edge of an otherwise uncoated fabric from raveling. The procedure is substantially as explained in Example I; that is, selecting the general area of a fabric that is to be cut, applying a radiation-curable coating, and curing and crosslinking the resin.

Coating formulations representative of those described herein are given in Table 4. The compositions given in Table 4 are for a series of formulations whose performance is evaluated for their ability to strengthen the fabric edge by binding the warp and fill yarns together at the crossover points. A further requirement of these compositions is that they do not adhere to the rubber sheet stock against which the release liner comes in contact with during use. Included are the formulations for eight compositions which differ in the relative amounts of mono- and di-functional reactive diluents and the addition of a polysiloxane copolymer surfactant.

Test results for the formulations in Table 4 are shown in Tables 5–8. These tests are representative of those which are of importance in many coated fabric applications, including release liners. The combout resistance data given in Table 5 is especially relevant to coatings applied for the purpose of ravel resistance. This data indicates a clear and dramatic increase in combout resistance, and hence, ravel resistance. The effect on weight gain, thickness and flexibility are shown in Tables 6–8. All resulting values are well within the acceptable range for application of coated fabrics, including automotive release liners.

It should be understood that various changes and modifications to the presently preferred embodiments described herein will be apparent to those skilled in the art. Such changes and modifications can be made without departing from the spirit and scope of the present invention.

TABLE 4

| COMPONENT | Coating Formulations Formulation (Grams) | | | | | | | |
|---|---|---|---|---|---|---|---|---|
| | 1 | 2 | 3 | 4 | 5 | 6 | 7 | 8 |
| Acrylated aromatic urethane oligomer | 80 | 80 | 80 | 80 | 80 | 80 | 80 | 80 |
| Acrylated ester of tripropylene glycol | 10 | 10 | 10 | 10 | 20 | 20 | 20 | 20 |
| Acrylated ester of alkyl alcohol | 10 | 10 | 20 | 20 | 10 | 10 | 20 | 20 |
| Aromatic substituted propanol | 4.0 | 4.0 | 4.0 | 4.0 | 4.0 | 4.0 | 4.0 | 4.0 |
| Polyether modified dimethyl polysiloxane copolymer | 0 | 0.1 | 0 | 0.1 | 0 | 0.1 | 0 | 0.1 |

TABLE 5

| Coated Fabric Combout[1] | | | | | | | | | |
|---|---|---|---|---|---|---|---|---|---|
| | FORMULATION[2] | | | | | | | | |
| CONTROL[3] | 1 | 2 | 3 | 4 | 5 | 6 | 7 | 8 |
| 38.9 | 129.5 | 148.7 | 196.1 | 170.0 | 156.5 | 185.7 | 123.8 | 166.0 |

[1]The combout resistance test uses an instrumental tensiometer and special test fixture to comb yarns out of the woven fabric and measure the force required to do so. The test method and apparatus are described in "The Steger Tensile Test," Bobbin Magazine, June 1985, pp. 140–141.

[2]Correspond to formulations in Table 4, all coatings silkscreen applied through a mesh screen; cured with ultraviolet light source at 100 feet/minute.

[3]Control is uncoated 420 denier nylon fabric, Highland Industries Style #39010.

TABLE 6

| Weight Gain by Coated Fabric (Oz./Sq. Yd.) | | | | | | | |
|---|---|---|---|---|---|---|---|
| FORMULATION | | | | | | | |
| 1 | 2 | 3 | 4 | 5 | 6 | 7 | 8 |
| 0.29 | 0.71 | 1.16 | 0.81 | 1.34 | 0.88 | 0.66 | 1.02 |

TABLE 7

Thickness Increase by Coated Fabric (Inches)
FORMULATION

| 1 | 2 | 3 | 4 | 5 | 6 | 7 | 8 |
|---|---|---|---|---|---|---|---|
| 0.0008 | 0.0004 | 0.0004 | 0.0002 | 0.0005 | 0.0002 | 0.0002 | 0.0002 |

TABLE 8

Flexibility of Coated Fabrics (In. Deflection, Warp/Fill)
FORMULATION

| #1 | #2 | #3 | #4 |
|---|---|---|---|
| .124/.478 | .333/.501 | .205/.667 | .580/.663 |
| #5 | #6 | #7 | #8 |
| .591/.438 | .676/.756 | .759/.708 | .737/.796 |

TABLE 9

Properties of Coated Fabric[1]

| TEST | RESULTS |
|---|---|
| Coated Fabric Combout Resistance (Lbf) | 166.5 |
| Weight Gain by Coated Fabric (Oz./Sq. Yd.) | 0.75 |
| Thickness Increased by Coated Fabric (Inch) | 0.0004 |
| Flexibility of Coated Fabric (Inch, Warp/Fill) | 0.233/0.301 |
| FMVSS.302 Flammability, Warp/Fill | SE/SE |

[1]420 denier nylon fabric Highland Industries, Style #32012
[2]Coating applied through a mesh screen; cured with ultraviolet light source at 50 feet/minute.

We claim:

1. A release liner fabric having a reinforced cut edge, said release liner consisting essentially of:

a) an elongated fabric panel; and b) a thin layer of a radiation-cured resin applied to a pre-selected area of a nonselvage edge of said elongated fabric panel, said radiation-cured resin being curable and crosslinkable at substantially ambient temperatures, said resin being selected from the group consisting of polyfunctional acrylic monomers, acrylated urethane oligomers and acrylated urethane polymers.

2. The release liner according to claim 1, wherein the fabric is coated with the radiation-curable resin in patterns defining a plurality of parallel bands extending lengthwise, irradiated and cut within the bands of irradiated resin to form said release liner.

3. The release liner according to claim 1, wherein the fabric is woven.

4. The release liner according to claim 3, wherein the fabric is woven in a plain square weave.

5. The release liner according to claim 1, wherein the fabric is formed from warp yarn having a denier of between about 150 to 1000.

6. The release liner according to claim 1, wherein the fabric is formed from weft yarn having a denier of between about 150 to 1000.

7. The release liner according to claim 1, wherein the fabric has a weight of between about 3 oz/yd$^2$ to 8 oz/yd$^2$.

* * * * *